United States Patent
Roth et al.

(10) Patent No.: US 10,412,059 B2
(45) Date of Patent: *Sep. 10, 2019

(54) RESOURCE LOCATORS WITH KEYS

(71) Applicant: Amazon Technologies, Inc., Seattle, WA (US)

(72) Inventors: Gregory Branchek Roth, Seattle, WA (US); Eric Jason Brandwine, Haymarket, VA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/786,322

(22) Filed: Oct. 17, 2017

(65) Prior Publication Data

US 2018/0041480 A1 Feb. 8, 2018

Related U.S. Application Data

(60) Continuation of application No. 14/992,599, filed on Jan. 11, 2016, now Pat. No. 9,819,654, which is a
(Continued)

(51) Int. Cl.
*H04L 9/32* (2006.01)
*H04L 29/06* (2006.01)
*H04L 29/08* (2006.01)

(52) U.S. Cl.
CPC .......... *H04L 63/0428* (2013.01); *H04L 9/321* (2013.01); *H04L 9/3247* (2013.01);
(Continued)

(58) Field of Classification Search
CPC ............... H04L 9/3247; H04L 9/321
(Continued)

(56) References Cited

U.S. PATENT DOCUMENTS 5,179,591 A 1/1993 Hardy et al.
5,200,999 A 4/1993 Matyas et al.
(Continued)

FOREIGN PATENT DOCUMENTS

CN 101938461 1/2011
CN 102624737 8/2012
(Continued)

OTHER PUBLICATIONS

Amazon, "Amazon Prime Video—security considerations," Amazon.com General Help Forum, http://www.amazon.com/gp/help/customer/forums?ie=UTF8&cdForum=Fx2NFGOONPZEXIP&cdPage=1&cdSort=newest&cdThread=Tx18VZVGGU0Y32, latest reply Jun. 17, 2013, 3 pages.
(Continued)

*Primary Examiner* — Mohammad W Reza
(74) *Attorney, Agent, or Firm* — Davis Wright Tremaine, LLP; Matt Williams

(57) ABSTRACT

Requests are pre-generated to include a cryptographic key to be used in fulfilling the requests. The requests may be encoded in uniform resource locators and may include authentication information to enable a service provider to whom the requests are submitted to determine whether the requests are authorized. The requests may be passed to various entities who can then submit the requests to the service provider. The service provider, upon receipt of a request, can verify the authentication information and fulfill the request using a cryptographic key encoded in the request.

20 Claims, 10 Drawing Sheets

Related U.S. Application Data division of application No. 14/037,282, filed on Sep. 25, 2013, now Pat. No. 9,237,019.

(52) U.S. Cl.
CPC ............ *H04L 63/10* (2013.01); *H04L 63/102* (2013.01); *H04L 63/123* (2013.01); *H04L 67/02* (2013.01); *H04L 63/168* (2013.01)

(58) Field of Classification Search
USPC ........................................................ 713/168
See application file for complete search history.

(56) References Cited

U.S. PATENT DOCUMENTS

| | | |
|---|---|---|
| 5,497,421 A | 3/1996 | Kaufman et al. |
| 6,084,969 A | 7/2000 | Wright et al. |
| 6,097,817 A | 8/2000 | Bilgic et al. |
| 6,185,316 B1 | 2/2001 | Buffam |
| 6,453,416 B1 | 9/2002 | Epstein |
| 6,760,711 B1 | 7/2004 | Gillett et al. |
| 6,826,686 B1 | 11/2004 | Peyravian et al. |
| 6,851,054 B2 | 2/2005 | Wheeler et al. |
| 6,957,393 B2 | 10/2005 | Fano et al. |
| 6,959,394 B1 | 10/2005 | Brickell et al. |
| 6,985,583 B1 | 1/2006 | Brainard et al. |
| 7,010,689 B1 | 3/2006 | Matyas et al. |
| 7,073,195 B2 | 7/2006 | Brickell et al. |
| 7,139,917 B2 | 11/2006 | Jablon |
| 7,228,417 B2 | 6/2007 | Roskind |
| 7,320,076 B2 | 1/2008 | Caronni |
| 7,512,965 B1 | 3/2009 | Amdur et al. |
| 7,685,430 B1 | 3/2010 | Masurkar |
| 7,721,322 B2 | 5/2010 | Sastry et al. |
| 7,757,271 B2 | 7/2010 | Amdur et al. |
| 7,765,584 B2 | 7/2010 | Roskind |
| 7,836,306 B2 | 11/2010 | Pyle et al. |
| 7,890,767 B2 | 2/2011 | Smith et al. |
| 7,913,084 B2 | 3/2011 | Medvinsky et al. |
| 7,917,764 B2 | 3/2011 | Futa |
| 8,006,289 B2 | 8/2011 | Hinton et al. |
| 8,024,562 B2 | 9/2011 | Gentry et al. |
| 8,041,954 B2 | 10/2011 | Plesman |
| 8,059,820 B2 | 11/2011 | Malaviarachchi et al. |
| 8,151,116 B2 | 4/2012 | van Der Horst et al. |
| 8,275,356 B2 | 9/2012 | Hickie |
| 8,332,922 B2 | 12/2012 | Dickinson et al. |
| 8,370,638 B2 | 2/2013 | Duane et al. |
| 8,386,800 B2 | 2/2013 | Kocher et al. |
| 8,387,117 B2 | 2/2013 | Eom et al. |
| 8,418,222 B2 | 4/2013 | Gbadegesin et al. |
| 8,423,759 B2 | 4/2013 | Moreau |
| 8,453,198 B2 | 5/2013 | Band et al. |
| 8,464,058 B1 | 6/2013 | Chen et al. |
| 8,464,354 B2 | 6/2013 | Teow et al. |
| 8,533,772 B2 | 9/2013 | Garg et al. |
| 8,543,916 B2 | 9/2013 | Anderson et al. |
| 8,561,152 B2 | 10/2013 | Novak et al. |
| 8,621,561 B2 | 12/2013 | Cross et al. |
| 8,688,813 B2 | 4/2014 | Maes |
| 8,695,075 B2 | 4/2014 | Anderson et al. |
| 8,739,308 B1 | 5/2014 | Roth |
| 8,745,205 B2 | 6/2014 | Anderson et al. |
| 8,769,289 B1 | 7/2014 | Kronrod |
| 8,776,190 B1 | 7/2014 | Cavage et al. |
| 8,776,204 B2 | 7/2014 | Faynberg et al. |
| 8,793,774 B1 * | 7/2014 | Kumar .................... H04L 63/20 726/3 |
| 8,868,923 B1 | 10/2014 | Hamlet et al. |
| 8,892,865 B1 | 11/2014 | Roth |
| 8,977,857 B1 | 3/2015 | Triscon |
| 8,997,198 B1 | 3/2015 | Kelley et al. |
| 2001/0008013 A1 | 7/2001 | Johnson et al. |
| 2001/0018739 A1 | 8/2001 | Anderson et al. |
| 2002/0016840 A1 | 2/2002 | Herzog et al. |
| 2002/0067832 A1 | 6/2002 | Jablon |
| 2002/0083178 A1 | 6/2002 | Brothers |
| 2002/0112181 A1 | 8/2002 | Smith |
| 2002/0161723 A1 | 10/2002 | Asokan et al. |
| 2002/0161998 A1 | 10/2002 | Cromer et al. |
| 2002/0162019 A1 | 10/2002 | Berry et al. |
| 2002/0194483 A1 | 12/2002 | Wenocur et al. |
| 2002/0198848 A1 | 12/2002 | Michener |
| 2003/0016826 A1 | 1/2003 | Asano et al. |
| 2003/0041110 A1 | 2/2003 | Wenocur et al. |
| 2003/0135740 A1 | 7/2003 | Talmor et al. |
| 2003/0145197 A1 | 7/2003 | Lee et al. |
| 2003/0149781 A1 | 8/2003 | Yared et al. |
| 2003/0188117 A1 | 10/2003 | Yoshino et al. |
| 2004/0088260 A1 | 5/2004 | Foster et al. |
| 2004/0103096 A1 | 5/2004 | Larsen |
| 2004/0128505 A1 | 7/2004 | Larsen |
| 2004/0128510 A1 | 7/2004 | Larsen |
| 2004/0131185 A1 | 7/2004 | Kakumer |
| 2004/0143733 A1 | 7/2004 | Ophir et al. |
| 2004/0158734 A1 | 8/2004 | Larsen |
| 2004/0172535 A1 | 9/2004 | Jakobsson et al. |
| 2005/0036611 A1 | 2/2005 | Seaton et al. |
| 2005/0043999 A1 | 2/2005 | Ji et al. |
| 2005/0060580 A1 | 3/2005 | Chebolu et al. |
| 2005/0080914 A1 | 4/2005 | Lerner et al. |
| 2005/0132192 A1 | 6/2005 | Jeffries et al. |
| 2005/0132215 A1 | 6/2005 | Wang et al. |
| 2005/0166263 A1 | 7/2005 | Nanopoulos et al. |
| 2005/0235148 A1 | 10/2005 | Scheidt et al. |
| 2005/0273862 A1 | 12/2005 | Benaloh et al. |
| 2005/0278547 A1 | 12/2005 | Hyndman et al. |
| 2006/0070116 A1 | 3/2006 | Park |
| 2006/0075462 A1 | 4/2006 | Golan et al. |
| 2006/0094406 A1 | 5/2006 | Cortegiano |
| 2006/0094410 A1 | 5/2006 | Cortegiano |
| 2006/0100928 A1 | 5/2006 | Waleczak, Jr. et al. |
| 2006/0130100 A1 | 6/2006 | Pentland |
| 2006/0149677 A1 | 7/2006 | Shahine et al. |
| 2006/0174125 A1 | 8/2006 | Brookner |
| 2006/0190331 A1 | 8/2006 | Tollinger et al. |
| 2006/0206440 A1 | 9/2006 | Anderson et al. |
| 2006/0206925 A1 | 9/2006 | Dillaway et al. |
| 2006/0218625 A1 | 9/2006 | Pearson et al. |
| 2006/0230284 A1 | 10/2006 | Fiske |
| 2006/0256961 A1 | 11/2006 | Brainard et al. |
| 2006/0271785 A1 | 11/2006 | Holtmanns et al. |
| 2006/0282878 A1 | 12/2006 | Stanley et al. |
| 2007/0005955 A1 | 1/2007 | Pyle et al. |
| 2007/0033396 A1 | 2/2007 | Zhang et al. |
| 2007/0037552 A1 | 2/2007 | Lee et al. |
| 2007/0061571 A1 | 3/2007 | Hammes et al. |
| 2007/0061885 A1 | 3/2007 | Hammes et al. |
| 2007/0136361 A1 | 6/2007 | Lee et al. |
| 2007/0157309 A1 | 7/2007 | Bin et al. |
| 2007/0174614 A1 | 7/2007 | Duane et al. |
| 2007/0186102 A1 | 8/2007 | Ng |
| 2007/0234410 A1 | 10/2007 | Geller |
| 2007/0250706 A1 | 10/2007 | Oba |
| 2007/0277231 A1 | 11/2007 | Medvinsky et al. |
| 2008/0010665 A1 | 1/2008 | Hinton et al. |
| 2008/0040773 A1 | 2/2008 | AlBadarin et al. |
| 2008/0066150 A1 | 3/2008 | Lim |
| 2008/0080718 A1 | 4/2008 | Meijer et al. |
| 2008/0083036 A1 | 4/2008 | Ozzie et al. |
| 2008/0109657 A1 | 5/2008 | Bajaj et al. |
| 2008/0163337 A1 | 7/2008 | Tuliani et al. |
| 2008/0168530 A1 | 7/2008 | Kuehr-McLaren et al. |
| 2008/0182592 A1 | 7/2008 | Cha et al. |
| 2008/0222694 A1 | 9/2008 | Nakae |
| 2008/0301444 A1 * | 12/2008 | Kim .................. H04L 63/08 713/169 |
| 2008/0301630 A1 | 12/2008 | Arnold et al. |
| 2008/0313719 A1 | 12/2008 | Kaliski, Jr. et al. |
| 2009/0013402 A1 | 1/2009 | Plesman |
| 2009/0019134 A1 | 1/2009 | Bellifemine et al. |
| 2009/0049518 A1 | 2/2009 | Roman et al. |
| 2009/0172793 A1 | 7/2009 | Newstadt et al. |
| 2009/0204808 A1 | 8/2009 | Guo et al. |

(56) References Cited

U.S. PATENT DOCUMENTS

| | | |
|---|---|---|
| 2009/0210712 A1 | 8/2009 | Fort |
| 2009/0217385 A1 | 8/2009 | Teow et al. |
| 2009/0254572 A1 | 10/2009 | Redlich et al. |
| 2009/0320093 A1 | 12/2009 | Glazier et al. |
| 2010/0017603 A1 | 1/2010 | Jones |
| 2010/0037304 A1 | 2/2010 | Canning et al. |
| 2010/0058060 A1 | 3/2010 | Schneider |
| 2010/0058072 A1 | 3/2010 | Teow et al. |
| 2010/0071056 A1 | 3/2010 | Cheng |
| 2010/0083001 A1 | 4/2010 | Shah et al. |
| 2010/0111296 A1 | 5/2010 | Brown et al. |
| 2010/0125894 A1 | 5/2010 | Yasrebi et al. |
| 2010/0131756 A1 | 5/2010 | Schneider |
| 2010/0142704 A1 | 6/2010 | Camenisch et al. |
| 2010/0205649 A1 | 8/2010 | Becker et al. |
| 2010/0239095 A1 | 9/2010 | Carter et al. |
| 2010/0251347 A1 | 9/2010 | Roskind |
| 2010/0269156 A1 | 10/2010 | Hohlfeld et al. |
| 2010/0290476 A1 | 11/2010 | Brindle et al. |
| 2010/0332845 A1 | 12/2010 | Asaka |
| 2011/0004753 A1 | 1/2011 | Gomi et al. |
| 2011/0010538 A1 | 1/2011 | Falk et al. |
| 2011/0035593 A1 | 2/2011 | Pyle et al. |
| 2011/0055562 A1 | 3/2011 | Adelman et al. |
| 2011/0055585 A1 | 3/2011 | Lee |
| 2011/0078107 A1 | 3/2011 | Almeida et al. |
| 2011/0083015 A1 | 4/2011 | Meier |
| 2011/0099362 A1 | 4/2011 | Haga et al. |
| 2011/0131415 A1 | 6/2011 | Schneider |
| 2011/0138192 A1 | 6/2011 | Kocher et al. |
| 2011/0167479 A1 | 7/2011 | Maes |
| 2011/0179469 A1 | 7/2011 | Blinn et al. |
| 2011/0231940 A1 | 9/2011 | Perumal et al. |
| 2011/0239283 A1 | 9/2011 | Chern |
| 2011/0252229 A1 | 10/2011 | Belenkiy et al. |
| 2011/0264907 A1 | 10/2011 | Betz et al. |
| 2011/0265172 A1 | 10/2011 | Sharma et al. |
| 2011/0296497 A1 | 12/2011 | Becker |
| 2011/0311055 A1 | 12/2011 | Parann-Nissany |
| 2011/0320606 A1 | 12/2011 | Madduri et al. |
| 2012/0017095 A1 | 1/2012 | Blenkhorn et al. |
| 2012/0020474 A1 | 1/2012 | Kudoh et al. |
| 2012/0023334 A1 | 1/2012 | Brickell et al. |
| 2012/0036551 A1 | 2/2012 | Le Saint et al. |
| 2012/0054625 A1 | 3/2012 | Pugh et al. |
| 2012/0060035 A1 | 3/2012 | Kalmady et al. |
| 2012/0079288 A1 | 3/2012 | Hars |
| 2012/0106735 A1 | 5/2012 | Fukuda |
| 2012/0110636 A1 | 5/2012 | Van Biljon et al. |
| 2012/0144034 A1 | 6/2012 | McCarty |
| 2012/0159577 A1 | 6/2012 | Belinkiy et al. |
| 2012/0233216 A1 | 9/2012 | Lim |
| 2012/0243687 A1 | 9/2012 | Li et al. |
| 2012/0245978 A1 | 9/2012 | Jain et al. |
| 2012/0265690 A1 | 10/2012 | Bishop et al. |
| 2012/0317414 A1 | 12/2012 | Glover |
| 2012/0331284 A1 | 12/2012 | Kouladjie et al. |
| 2013/0031255 A1 | 1/2013 | Maloy et al. |
| 2013/0086662 A1 | 4/2013 | Roth |
| 2013/0086663 A1 | 4/2013 | Roth et al. |
| 2013/0111217 A1 | 5/2013 | Kopasz et al. |
| 2013/0132232 A1 | 5/2013 | Pestoni et al. |
| 2013/0145447 A1 | 6/2013 | Maron |
| 2013/0166906 A1 | 6/2013 | Swaminathan et al. |
| 2013/0166918 A1 | 6/2013 | Shahbazi et al. |
| 2013/0191884 A1 | 7/2013 | Leicher et al. |
| 2013/0198519 A1 | 8/2013 | Marien |
| 2013/0247218 A1 | 9/2013 | Jhingan et al. |
| 2013/0254536 A1 | 9/2013 | Glover |
| 2013/0282461 A1 | 10/2013 | Ovick et al. |
| 2013/0318630 A1 | 11/2013 | Lam |
| 2014/0013409 A1 | 1/2014 | Halageri |
| 2014/0082715 A1 | 3/2014 | Grajek et al. |
| 2014/0122866 A1 | 5/2014 | Haeger et al. |
| 2014/0181925 A1 | 6/2014 | Smith |
| 2014/0208408 A1 | 7/2014 | Bilgen et al. |
| 2014/0281477 A1 | 9/2014 | Nayshtut et al. |
| 2014/0281487 A1 | 9/2014 | Klausen et al. |
| 2015/0082039 A1 | 3/2015 | Stalzer et al. |
| 2015/0089614 A1 | 3/2015 | Mathew et al. |

FOREIGN PATENT DOCUMENTS

| | | |
|---|---|---|
| JP | 2001202452 | 7/2001 |
| JP | 2001356952 | 12/2001 |
| JP | 2002190795 | 7/2002 |
| JP | 2003242124 | 8/2003 |
| JP | 2004193921 | 7/2004 |
| JP | 2005197912 | 7/2005 |
| JP | 2006128873 | 5/2006 |
| JP | 2007053658 | 3/2007 |
| JP | 2009534724 | 9/2009 |
| JP | 2011008701 | 1/2011 |
| JP | 2011054028 | 3/2011 |
| JP | 2011211537 | 10/2011 |
| KR | 20060091548 | 8/2006 |
| WO | WO2006077822 | 7/2006 |
| WO | WO2008024705 | 2/2008 |
| WO | WO2008089276 | 7/2008 |
| WO | WO2014063361 | 5/2014 |

OTHER PUBLICATIONS

Berners-Lee et al., "Uniform Resource Identifier (URI): Generic Syntax," Network Working Group Request for Comments: 3986, The Internet Society 2005, retrieved on Nov. 30, 2011, from http://www.ietf.org/rfc/rfc3986.txt.

Ghorbei-Talbi et al., "Managing Delegation in Access Control Models," International Conference on Advanced Computing and Communications, pp. 744-751, Dec. 18-21, 2007.

International Search Report and Written Opinion dated Dec. 30, 2014, in International Patent Application No. PCT/US2014/057043, filed Sep. 23, 2014.

International Search Report and Written Opinion dated Dec. 30, 2014, in International Patent Application No. PCT/US2014/057051, filed Sep. 23, 2014.

International Search Report and Written Opinion dated Oct. 22, 2014, International Patent Application No. PCT/US2014/042569, filed Jun. 16, 2014.

Japanese Final Rejection for Patent Application No. 2016-542890 filed Sep. 23, 2014, 4 pages.

Krawczyk et al., "HMAC: Keyed-Hashing for Message Authentication," Internet Engineering Task Force (IETF) Request for Comments: 2104, Feb. 1997, retrieved Jan. 22, 2015, from https://tols.ietf.org/html/rfc2104, pp. 1-11.

Liscano et al., "A Context-based Delegation Access Control Model for Pervasive Computing," 21st International Conference on Advanced Information Networking and Applications Workshops 2:44-51, May 21-23, 2007.

Massachusetts Institute of Technology, "Kerberos V5 Installation Guide [online]," May 2012, retrieved on Jun. 27, 2012, from http://web.mit.edu/kerberos/krb5-1.10/krb5-1.10.2/doc/krb5-install.htm, 65 pages.

Massachusetts Institute of Technology, "Kerberos V5 System Administrator's Guide [online]," May 2012, retrieved on Jun. 27, 2012, from http://web.mit.edu/kerberos/krb5-1.10/krb5-1.10.2/doc/krb5-admin.html, 57 pages.

Massachusetts Institute of Technology, "Kerberos V5 UNIX User's Guide," May 2012, retrieved on Jun. 28, 2012, from http://web.mit.edu/kerberos/krb5-1.10/krb5-1.10.2/doc/krb5-user.html, 38 pages.

Patent Cooperation Treaty, "Notification of Transmittal of the International Search Report and the Written Opinion of the International Searching Authority, or the Declaration," issued to International Application No. PCT/US2012/058083 dated Dec. 27, 2012.

Roth et al., "Hierarchical Data Access Techniques," U.S. Appl. No. 13/431,882, filed Mar. 27, 2012.

Schneier, "Applied Cryptography," John Wiley & Sons, Second Edition, 1996, pp. 34-41.

(56) References Cited

OTHER PUBLICATIONS

Simpson, "PPP Challenge Handshake Authentication Protocol (CHAP)," Network Working Group, Aug. 1996, retrieved from internet Jun. 27, 2012, http://etherpad.tools.ietf.org/html/rfc1994, 13 pages.
Tcg Published, "TPM Main Part 1 Design Principles," Specification Version 1.2, Revision 116, Mar. 1, 2011, 184 pages.
TCG Published, "TPM Main Part 2 TPM Structures," Specification Version 1.2, Level 2 Revision 116, Mar. 1, 2011, 202 pages.
TCG Published, "TPM Main Part 3 Commands," Specification Version 1.2, Level 2 Revision 116, Mar. 1, 2011, 339 pages.
U.S. Appl. No. 13/431,760, filed Mar. 27, 2012.
U.S. Appl. No. 13/431,898, filed Mar. 27, 2012.
Wang et al., "Extending the Security Assertion Markup Language to Support Delegation for Web Services and Grid Services," IEEE International Conference on Web Services 1:67-74, Jul. 11-15, 2005.
Wikipedia, "Physical unclonable function," retrieved Aug. 22, 2013, from http://en.wikipedia.org/wiki/Physical_unclonable_function, 8 pages.
Chinese First Office Action for Patent Application No. 201480052715.X, dated May 3, 2018, 19 pages.
Chinese First Office Action for Patent Application No. 201480052720.0, dated May 2, 2018, 18 pages.
Japanese Decision to Grant a Patent dated Jul. 18, 2018, for Patent Application No. 2016-542891, 6 pages.
Canadian Office Action for Patent Application No. 2,923,437 dated Mar. 27, 2018, 4 pages.
Canadian Office Action for Patent Application No. 2,923,438, dated Nov. 22, 2017, 4 pages.
European Communication pursuant to Article 94(3) EPC for Application No. 14849276.2 dated Apr. 3, 2018, 5 pages.
Japanese Final Rejection, dated Feb. 13, 2018, for Patent Application No. 2016-542891, 12 pages.
Canadian Office Action for Patent Application No. 2,923,437 dated Mar. 13, 2019, 3 pages.
Chinese Notice of Grant for Patent Application No. 201480052720.0 dated Mar. 26, 2019, 4 pages.
Canadian Office Action dated Oct. 30, 2018, for Patent Application No. 2,923,438, 6 pages.
Chinese Second Office Action for Patent Application No. 201480052715.X dated Dec. 4, 2018, 12 pages.
Chinese Second Office Action for Patent Application No. 201480052720.0 dated Nov. 27, 2018, 6 pages.
European 71(3) Communication for Patent Application No. 14849276.2 dated Dec. 5, 2018, 53 pages.
Japanese Final Rejection for Patent Application No. 2016-542890 dated Dec. 17, 2017, 4 pages.
Japanese Appeal Decision on Final Rejection, dated May 8, 2019, for Patent Application No. 2016-542890, 41 pages.
European Communication under Rule 71(3) EPC for Application No. 14846931.5, Intention to Grant, dated Apr. 15, 2019, 56 pages.
Chinese Third Office Action dated May 7, 2019 for Patent Application No. 201480052715.X, 34 pages.
Japanese First Office Action, dated May 20, 2019, for Patent Application No. 2018-111507, 10 pages.
Japanese First Office Action, dated May 31, 2019, for Patent Application No. 2018-078782, 8 pages.

\* cited by examiner

RESOURCE LOCATORS WITH KEYS

CROSS REFERENCE TO RELATED APPLICATIONS

This application is a continuation of U.S. patent application Ser. No. 14/992,599, filed on Jan. 11, 2016, which is a divisional of U.S. patent application Ser. No. 14/037,282, filed on Sep. 25, 2013, now U.S. Pat. No. 9,237,019, the disclosures of which are incorporated herein by reference in their entirety. This application also incorporates by reference for all purposes the full disclosure of U.S. patent application Ser. No. 14/037,292, filed Sep. 25, 2013, now U.S. Pat. No. 9,311,500.

BACKGROUND

The security of computing resources and associated data is of high importance in many contexts. As an example, organizations often utilize networks of computing devices to provide a robust set of services to their users. Networks often span multiple geographic boundaries and often connect with other networks. An organization, for example, may support its operations using both internal networks of computing resources and computing resources managed by others. Computers of the organization, for instance, may communicate with computers of other organizations to access and/or provide data while using services of another organization. In many instances, organizations configure and operate remote networks using hardware managed by other organizations, thereby reducing infrastructure costs and achieving other advantages. With such configurations of computing resources, ensuring that access to the resources and the data they hold is secure can be challenging, especially as the size and complexity of such configurations grow.

BRIEF DESCRIPTION OF THE DRAWINGS

Various embodiments in accordance with the present disclosure will be described with reference to the drawings, in which.

DETAILED DESCRIPTION

Figure 1:
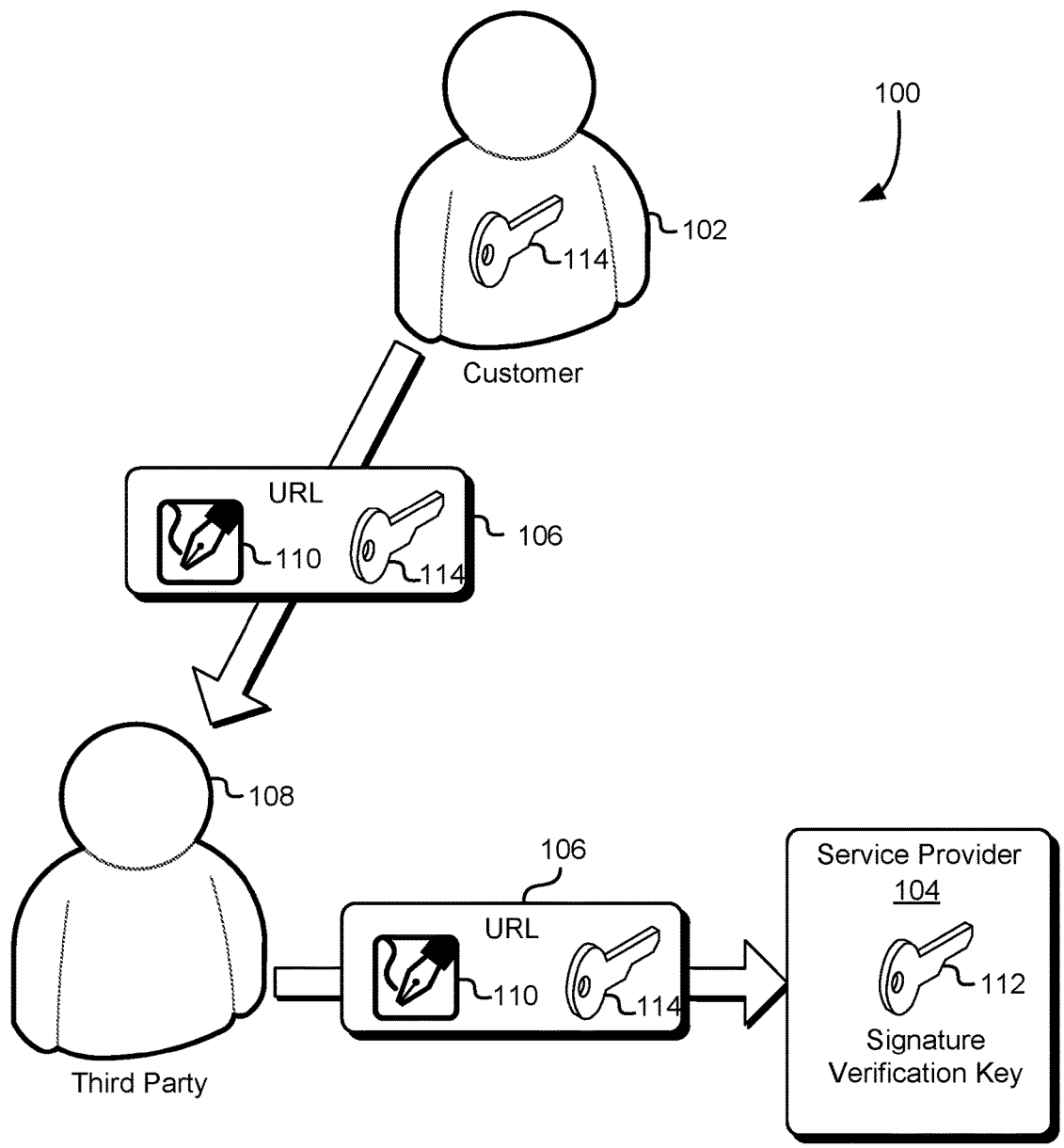
FIG. 1 shows an illustrative example of an environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include uses of uniform resource locators (URLs) and other references to computing resources (generally "resource locators") to enable access to services of a service provider. While URLs are used throughout the present disclosure for the purpose of illustration, it should be understood that the techniques described herein are generally applicable to other resource locators (i.e., instances of information usable by a system to locate a computing resource within the system). Moreover, the techniques described herein are generally applicable to electronic requests.

In an embodiment, a customer of a service provider (e.g., computing resource service provider) utilizes one or more services of the service provider. As an example, the customer may utilize data storage services of the service provider to achieve various advantages, such as reduced capital expense, simpler data management, higher availability, lower latency due to distributed data processing facilities and the like. To enable others (e.g., customers of the customer or, generally, users authorized by the customer) to access resources of the customer managed by the provider, the customer may utilize pre-signed URLs. To generate a pre-signed URL, the customer may generate a URL (or, generally, a request) and an electronic (digital) signature of a portion of the URL. The portion of the URL used to generate the electronic signature may include a cryptographic key to be used in processing the request. The cryptographic key may be provided in various forms. For example, the cryptographic key may be a plaintext symmetric key, a plaintext public key of a public-private key pair, or a symmetric key encrypted in a way that the service provider is able to decrypt or have decrypted to use the key to perform one or more cryptographic operations to fulfill the request.

Generally, the URL may be configured to encode a request, a cryptographic key, and authorization information which may include authentication information (e.g., electronic signature) usable to verify the request. The URL may be provided from the customer to another entity, not necessarily a third party, that, while referred to in the present disclosure as a third party, can be any entity authorized by the customer to cause the service provider to fulfill the request. The URL may be provided to the third party in various ways. For example, in some embodiments, the URL is provided in a web page or other organization of content transmitted over a network to the third party. Providing of the URL may be subject to one or more conditions, such as receipt of valid login credentials from the third party, receipt of payment or a promise to pay from the third party and/or other conditions.

The third party may submit the request to the service provider to cause the service provider to fulfill the request. Prior to submission of the request, the third party may add additional information to the request, such as data to be operated on and/or one or more values of one or more parameters that indicate to the service provider how the request is to be processed. For example, the parameters may specify a selection of an encryption scheme and/or mode of an encryption scheme to use from a plurality of encryption schemes/modes that the service provider is configured with the ability to use.

Upon receipt of the request, the service provider may check the validity of the electronic signature to determine whether to fulfill the request. Other operations may be performed in determining whether to fulfill the request, such as determining whether fulfillment of the request would be in compliance with any applicable policy and/or with one or more parameters (e.g., expiration) encoded in the request (e.g., encoded as part of the authorization information). For requests that the service provider deems fulfillable, the service provider may extract a cryptographic key from the request, decrypt the extracted cryptographic key (if applicable), and perform one or more operations involved in fulfillment of the request. A response to the customer may be provided, such as an acknowledgment that the request was fulfilled and/or a result of performance of the one or more operations (e.g., data decrypted using a key provided in the request).

FIG. 1 shows an illustrative example of an environment 100 in which various embodiments can be implemented. As illustrated in FIG. 1 the environment 100 includes a customer 102 and is service provider 104. The customer 102 of the service provider 104 may utilize various services of the service provider in order to utilize various computing resources offered by the service provider 104. For example, the customer 102 may operate its own services and utilize computing resources of the service provider 104 in order to avoid expense and/or complications of implementing the computing resources on one's own. As an example, the customer 102 may provide as a service to other customers access to media files such as video files and/or audio files. However, in order to avoid the expense and trouble of maintaining a sufficiently robust data storage system the customer 102 may utilize data storage systems of the service provider 104 who may provide access to data storage systems to numerous customers such as the customer 102.

As noted above the customer 102 may have one or more of its own customers and accordingly various techniques of the present disclosure relate to allowing the customer 102 to provide services to its customers utilizing services of the service provider 104 without having to serve as a proxy for data stored by the service provider 104. One way of doing this as illustrated in FIG. 1 includes the customer 102 providing a URL 106 to a third party 108 who may be a customer of the customer 102 or, generally, a user of services of the customer 102. As noted in more detail below, the URL 106 may be provided from the customer 102 to the third party 108 in various ways.

As discussed in more detail below one way of providing the URL 106 to the third party 108 may be by the use of a webpage or other interface that encodes the URL so as to be selectable by a human operator of the third party 108. As an illustrative example, a human operator with an account with the customer 102 may log into a website of the customer 102 and as a result of having logged in may have access to the URL 106. The URL 106 may be provided from the customer 102 to the third party 108 in other ways as well. For example, the URL 106 may be encoded in an electronic mail message or other message from the customer 102 to the third party 108. As another example the URL 106 may be encoded in a document that is provided by in any suitable manner from the customer 102 to the third party 108. Generally any method by which the third party 108 has access to the URL 106 is considered as being within the scope of the present disclosure whether or not providing access includes transmission of the URL 106 over a network to the third party 108.

It should be noted that FIG. 1 illustrates flow of information between a customer 102 and a third party 108 who may be entities such as organizations and/or individuals. While the data is shown as flowing between the entities it should be understood that unless otherwise clear from context the data is transferred by way of suitable computing devices of the respective entities, examples of which are described below in connection with FIG. 10. As an example the URL 106 may be provided from the customer 102 from a web or other server of a customer 102. Similarly a human operator of the third party 108 may receive the URL 106 by way of a suitable device such as a personal computer, mobile device, tablet computing device, electronic book reader or generally any device configured to receive information through a network or other data receiving interface.

It should also be noted that while FIG. 1 shows the URL 106 being provided directly from the customer 102 to the third party 108, the URL 106 may be provided in various ways in accordance with various embodiments. As noted above for example, a server of the customer 102 may provide the URL 106 to the third party 108 such as encoded in a web page provided to the customer 102. Such a server however may be implemented using computing resources for example, virtual computer system and/or one or more storage devices hosted by the service provider 104. In other words while the customer 102 may have control over providing the URL 106 to the third party 108 the resources by which the URL 106 is provided to the third party 108 may not be directly hosted by the customer 102. In addition, the URL 106 may pass through one or more intermediaries which are not illustrated in FIG. 1. Other variations are also considered as being within the scope of the present disclosure.

As noted, the third party 108, upon receipt of the URL 106, can use the URL 106 to access services of the service provider 104. As an example which will be used throughout the present disclosure, the third party 108 can use the URL 106 to access data stored by the service provider 104 on behalf of the customer 102. In other words the customer 102 of the service provider 104 can use the URL 106 to allow third party 108 to obtain access to one or more computing resources such as media files posted by the service provider 104. It should be noted that while access to data (e.g., data retrieval) is used as an illustrative example throughout the present disclosure the techniques described herein can be used to provide access to services in numerous ways. For example, the URL 106 may be used to allow third party 108 to store data using resources of the service provider 104. Such use may be useful for example in instances when the customer 102 provides third parties the ability to store data as part of its service offerings. Generally the URL 106 may be used to provide access in any way in accordance with requests fulfillable by the service provider 104.

Returning to the illustrated embodiment, to gain access to resources hosted by the service provider 104, the third party 108 may provide the URL to the service provider 104. Various information may be included in the URL to enable the service provider 104 to determine how and/or whether to fulfill a request submitted by the third party 108 to the service provider 104 using the URL 106. For example as illustrated in FIG. 1, the URL 106 includes an electronic signature 110 which is verifiable by the service provider 104 by way of having access to a signature verification key 112 corresponding to the customer 102. The signature verification key 112 may be for example a symmetric cryptographic key to which the customer 102 also has access. In such an embodiment, the service provider 104 can verify the electronic signature 110 using one or more symmetric cryptographic signature verification algorithms in order to determine that the third party 108 is authorized by the customer 102 to submit a request using the URL 106. As another example the signature verification key 112 can be a public key of a public-private key pair where the customer 102 has access to a private key of the public-private key pair. The customer 102 may generate the electronic signature 110 using the private key which is may then be verified by the service provider 104 upon receipt of the electronic signature 110 from the third party 108. Generally any type of information included in the URL 106 that allows the service provider 104 to determine that a request from the customer 102 submitted using the URL 106 is authorized by the customer 102 may be used.

As illustrated in FIG. 1 the URL 106 may also include a cryptographic key 114. The cryptographic key 114 may be a cryptographic key to which the customer 102 has access. The type of cryptographic key included in the URL 106 may vary in accordance with various embodiments. In some embodiments for example, the cryptographic key 114 is a symmetric key to be used for encryption or decryption by the service provider 104. As another example the cryptographic key 114 may be a public key of a public-private key pair to which the private key is held by the customer 102 but to which access is lacked by the service provider 104. As yet another example the cryptographic key 114 may be included in the URL there may be a symmetric key included in the URL 106 in a form that is encrypted under another key where the other key may vary in accordance with various embodiments but is generally a key such that, upon receipt of the URL 106 from the third party 108, the service provider 104 is able to either on its own by use of another service, e.g., another third party service, to decrypt the cryptographic key 114 for use. Generally any way by which the cryptographic key 114 may be provided in the URL 106 to the third party 108 to enable the third party 108 to provide the URL 106 to the service provider 104 to enable the service provider 104 to use the cryptographic key 114 for one or more operations may be used. In this manner the third party 108 is able to utilize the services of the service provider 104 using the cryptographic key 114 provided by the customer 102.

As an illustrative example of one way in which this is useful the customer 102 may store data utilizing a data storage service of the service provider 104 where the data is stored in encrypted form using a key inaccessible to the service provider 104. By including the cryptographic key 114 in the URL 106 to the third party 108 the third party 108 can submit a request to the service provider 104 using the URL 106 in order to enable the service provider 104 to use the cryptographic key 114 to decrypt the data stored in the data storage service by the customer 102. Thus until the service provider 104 is provided the URL 106, the service provider 104 does not have an ability to access data of the customer 102 in plaintext form. It should be noted that the third party 108 may submit the request to the service provider 104 using the URL 106 in various ways. For example, an application of the third party 108 may provide the URL as part of a selectable user interface element on a graphical user interface. Upon selection of the selectable element an application such as a browser of the third party may contact a domain name service (DNS) in order to determine an internet protocol (IP) address to which a request should be submitted. A request may then be submitted to the IP address where the request may include the URL 106. Information in the URL 106 may then enable the service provider 104 to process the request accordingly.

Figure 2:
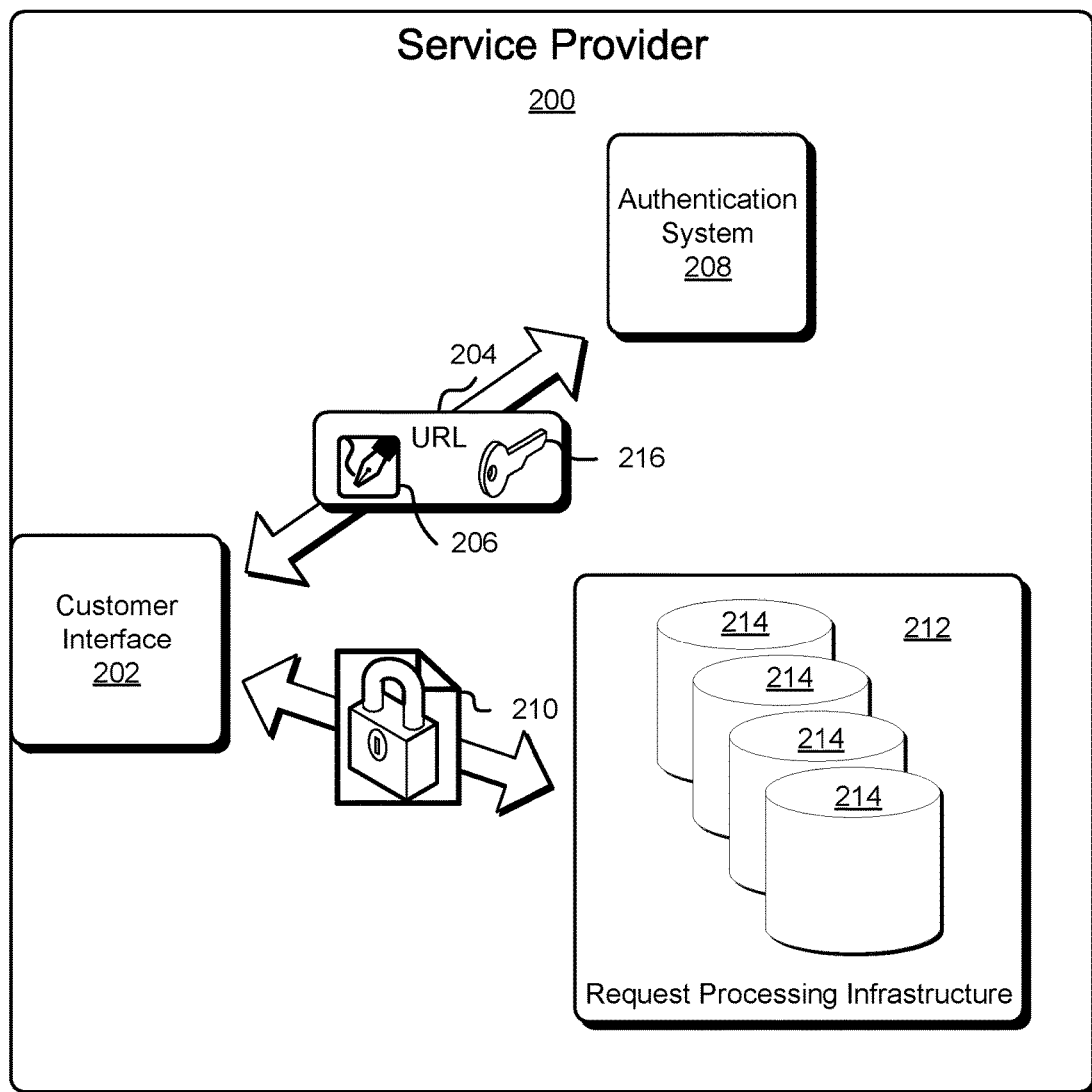
FIG. 2 shows an illustrative example of an environment in which various embodiments can be implemented.

FIG. 2 shows an illustrative example of an environment of a service provider 200 in accordance with various embodiments. As illustrated in FIG. 2, the service provider 200 includes a customer interface 202. The customer interface may be a subsystem of the service provider 200 which allows for the submission of requests from customers to be processed by the service provider 200 such as described above in connection with FIG. 1. The customer interface may accordingly include appropriate computing devices for providing the ability for customers to submit requests to the service provider 200. This customer interface, for example, may include one or more web servers configured to receive requests over the internet or another network. While not illustrated as such, other infrastructure may also be included in the customer interface 202, such as appropriate networking equipment that enable the customer interface 202 to operate suitably for the customer of the service provider 200.

When a request is received through the customer interface 202, the request may be received with appropriate authenticating information. For example, as illustrated in FIG. 2, a request may be received with a URL 204 that includes a signature 206 of a portion of the URL. The signature may be generated in accordance with various embodiments. For example, a customer that generated the URL 204 may generate the signature 206 using secret information shared between the customer and the service provider 200. As another example, a customer may have used an asymmetric digital signature scheme to sign the URL 204 using a private key of a private/public key pair. Generally, any type of information which is used to authenticate the URL 204 may be used and, in some embodiments, requests may be submitted without such information.

As illustrated in FIG. 2, however, when a request is received through the customer interface 202, a URL 204 of the request is provided (e.g., over an internal network of the service provider 200) with the signature 206 to an authentication system 208 of the service provider 200. Alternatively, a portion of the URL sufficient for generating the electronic signature 206 may be provided instead of the whole URL. The authentication system 208 may be a subsystem of the service provider 200 configured to authenticate requests such as by verifying electronic signatures provided with URLs included with requests. Upon verifying the signature 206 of the URL 204 the authentication system 208 may provide a response to the customer interface 202 that indicates whether the signature 206 is valid. A device (e.g., web server) of the customer interface 202 may use the information provided by the authentication system 208 to determine how to process the URL 204. For example, if the authentication system 208 indicates that the signature 206 is invalid, the customer interface 202 may deny the request. Similarly, if the information from authentication system 208 indicates that the signature 206 of the URL 204 is valid, the customer interface 202 may cause the request to be processed.

While not illustrated in the figure, the authentication system 208 or another system operating within or on behalf of the service provider 200 may operate to perform other operations in connection with determining how to process requests. For example, the authentication system 208 or another system operating in cooperation therewith may be used to check one or more policies which may be determinative of whether the request can be fulfilled. Policy determinations may be made based at least in part on various factors such as an identity of the requestor that submitted the request, a time of day, a logical identifier for a location in which data is stored or is to be stored and other contextual information. Policy may be managed through the customer interface 202 or another interface through appropriately-configured application programming interface (API) calls.

Returning to the embodiment illustrated in FIG. 2, if the authentication system 208 determines that the signature 206 is valid, the customer interface 202 may determine to process the request. Processing the request may involve the transfer of encrypted data 210 between the customer interface 202 and request processing infrastructure 212. The request processing infrastructure 212 may comprise one or more devices that collectively operate to provide a service of the service provider 200. For example, as illustrated in FIG. 2, the request processing infrastructure may comprise a plurality of data storage systems 214 used to store data on behalf of customer of the service provider 200. Other infrastructure including networking infrastructure while not illustrated may also be included. The passage of data, e.g., over a network between the customer interface 202 and the request processing infrastructure 212 may occur in various ways in accordance with various embodiments in accordance with the various types of requests that may be submitted through the customer interface 202. For example, if the URL 204 is included in a request to store data, a customer interface may utilize a key 216 provided in the URL 204 to encrypt the data and transmit the encrypted data 210 to the request processing infrastructure 212 for storage in one or more of the data storage systems 214.

Similarly, if the request is a request to retrieve data, a customer interface 202 may transmit a communication to the request processing infrastructure 212 that allows data from one or more of the data storage systems 214 to be provided to the customer interface 202. The customer interface 202 may then use a key 216 provided in the URL 204 to decrypt the encrypted data 210 and provide the decrypted data to the customer that submitted the request. It should be noted that the environment of the service provider 200 illustrated in FIG. 2 is simplified for the purpose of illustration and that numerous other devices and subsystems such as accounting systems that keep track of usage of the service provider 200 by customers may also be included. Further, a service provider 200 may include facilities located in different geographical locations for the purpose of redundancy and/or availability.

Figure 3:
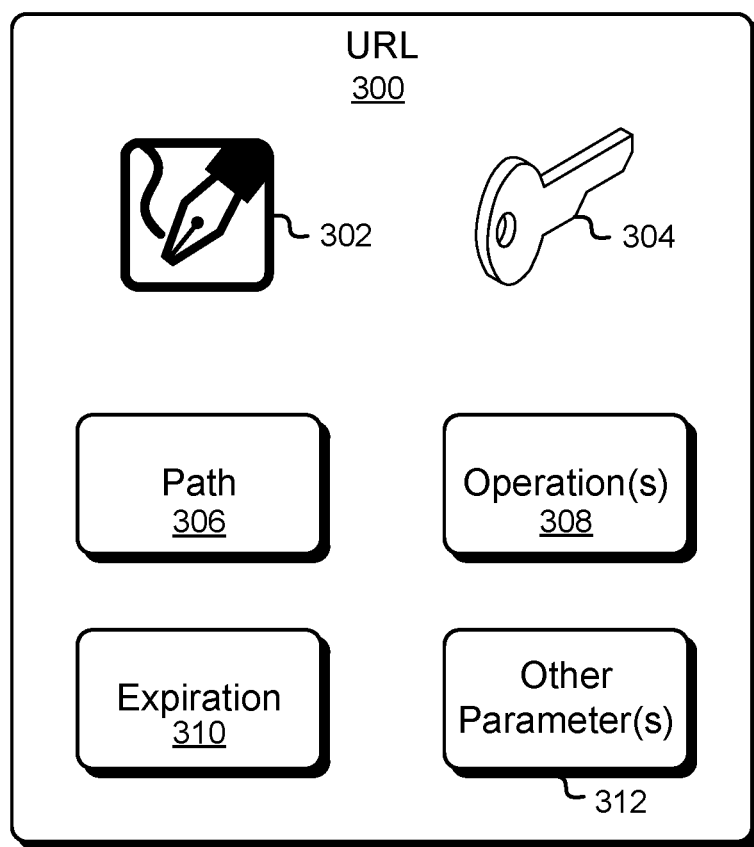
FIG. 3 shows an illustrative example of a uniform resource located (URL) in accordance with at least one embodiment.

FIG. 3 shows an illustrative example of a URL 300 in accordance with various embodiments. In an embodiment, as noted above, the URL 300 may include an electronic signature 302 of a portion of the URL 300 and a cryptographic key 304. The URL 300 may also include other information such as a path 306. The path 306 may include information which enables a service provider such as described above to locate one or more resources associated with a request submitted via the URL 300. Other information in the URL 300 may include information indicating one or more operations 308 to be performed by fulfillment of the request. Example operations that may be specified include, but are not limited to, storing data, retrieving data, generating a digital signature of data and others. In some embodiments, a URL may specify multiple operations and the order in which the operations should be performed.

As illustrated, the URL 300 includes an expiration 310. The expiration may encode a value for a time at which the URL 300 ceases to be useable for submission of fulfillable requests to a service provider. In other words, the expiration indicates a time at which otherwise fulfillable requests submitted using the URL become unfulfillable as a result of reaching the time. As an example, referring to FIG. 1 a customer 102 wishing to provide temporary access to certain data may utilize an expiration 310 in the URL 106 in order to limit the amount of time the URL 106 is useable to the third party 108. The expiration 310 may be included in data of the URL 300 used to generate the electronic signature 302 in order to ensure that the electronic signature 302 is only valid when the expiration 310 has not been modified since issuance by the customer. In this manner, access to the URL at a time after the expiration does not provide an ability to access data by simply modifying the expiration. A service provider receiving the URL 300 when determining whether to fulfill a request may utilize the expiration and/or other information to determine whether to fulfill a request. For example, if the URL provided with a request prior to the expiration 310, the service provider may fulfill the request (assuming all other requirements for fulfillment of the request, if any, have been fulfilled). Similarly, if the URL 300 is provided in connection with the request to the service provider after the expiration 310, the service provider may deny despite any other requirements for fulfillment of the request being satisfied. It should be noted that, while expiration is used throughout the present disclosure as a parameter that potentially is determinative of whether a provider will fulfill a request, criteria for fulfillment of a request may be more complex. For example, criteria for fulfillment of a request may be configured such that a request is fulfillable despite an expiration time having passed. Other contextual information (e.g., an identity of a requestor) may, for instance, supersede the expiration.

As illustrated, the URL 300 may also include other parameters 312. The other parameters may be parameters which enable the service provider to determine if and/or how to fulfill a request. For example, as noted above, the URL 300 may include an expiration 310. Another parameter included in the other parameters 312 may be a start time indicating a time at which the URL 300 become useable for submission of requests to a service provider. A combination of a start time and an expiration time may provide a time window during which a request submitted using the URL is fulfillable. A start time is useful, for example, in instances where access to data is to be prevented until a certain time (e.g., a release of a media file). Thus a customer of a service provider can pre-generate one or more URLs that will provide access to data or otherwise will be useable to submit fulfillable requests to a service provider at a later time. Such ability to pre-generate URLs that will, at a future time, enable access to data provide technical advantages, such as the ability to pre-prime a content delivery network (CDN) and/or pre-configure content with URLs without providing access to certain data until such access is desired to be given.

Referring to FIG. 1, the other parameters of the URL illustrated in FIG. 3 may include other information added by a third party including but not limited to: data on which one or more cryptographic operations are to be performed using the cryptographic key 304 (or 114 when referring to FIG. 1); parameters for how fulfillment of a request is to be performed.

Figure 4:
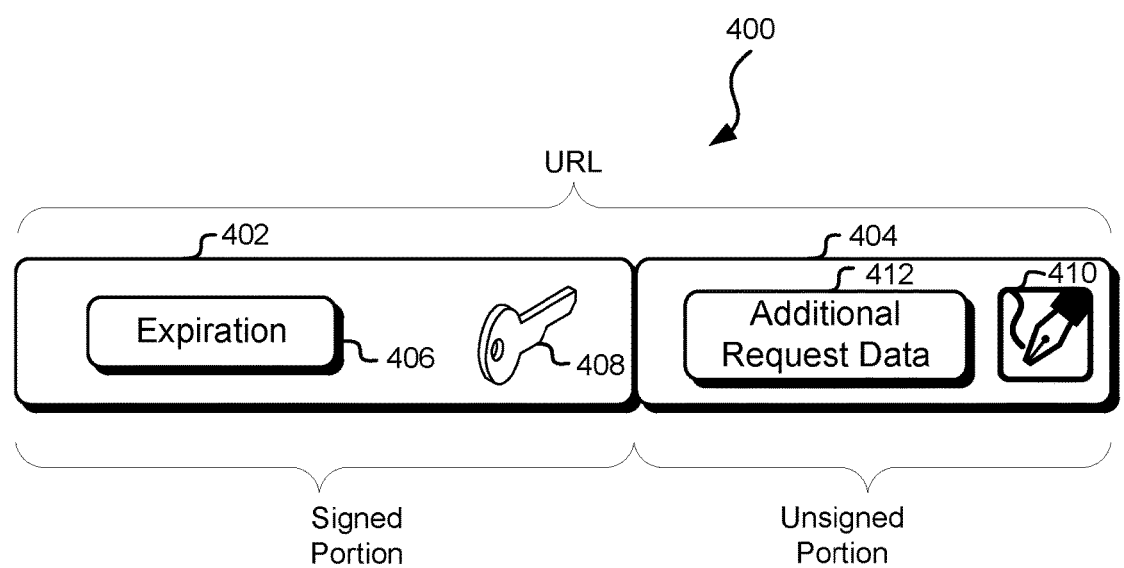
FIG. 4 shows another example of a URL in accordance with at least one embodiment.

FIG. 4 shows an illustrative example of a URL 400 which may be the URL 300 discussed above or generally any URL described herein. As illustrated the URL 400 includes a signed portion 402 and an unsigned portion 404. The signed portion may include information that modification of which can cause the URL 400 to become invalid. As an example discussed above, the signed portion 402 may include an expiration 406. In addition the signed portion may include a cryptographic key 408. Generally the signed portion may include any information for which the customer providing the URL 400 intends to prevent forgery of such information. The information can include for example, an identity authorized to submit the URL 400, timing information about when the URL 400 is useable (e.g., one or more start times and/or one or more expiration times), and other contextual information determinative of if and/or how a request submitted using the URL 400 should be processed. The unsigned portion of the URL 400 may include various information such as an electronic signature 410 such as described above an additional request data 412 which may be data added by third party on which one or more cryptographic operations are to be performed using the cryptographic key 408 and/or generally information which the third party is able to change without causing invalidity of the electronic signature 410.

The URL 400 is illustrated in a particular way to illustrate various aspects of the present disclosure. Numerous variations are considered as being within the scope of the present disclosure. For example, as illustrated in FIG. 4, the URL 400 shows a cryptographic key inside of a signed portion of the URL 400. In addition to or as an alternative to a cryptographic key inside of the signed portion of the URL 400, an unsigned portion of a URL may comprise a cryptographic key. For example, in some embodiments, a customer of a service provider may provide a URL with a signed portion to a third party. The third party may add a cryptographic key to the URL and use the URL with additional cryptographic key to submit a request to the service provider, where fulfillment of the request is authorized by the customer via the signature generated based at least in part on the signed portion of the URL. In this manner, the third party may utilize one or more services of the service provider without providing access to the cryptographic key to either the service provider (except when performing one or more cryptographic operations as part of fulfilling a request) or the customer. Thus a security breach or other event at either the customer or the service provider does not provide access to the cryptographic key and, therefore, does not enable access to data in plaintext form. Further, cryptographic operations may be performed using both a key in a signed portion of a URL (supplied by a customer) and a key in an unsigned portion of the URL (supplied by the third party). In this manner, cooperation between both the third party and the customer is required for access to data in plaintext form. Other variations, including variations where a key of the service provider is used alternatively or in addition are also considered as being within the scope of the present disclosure.

Figure 5:
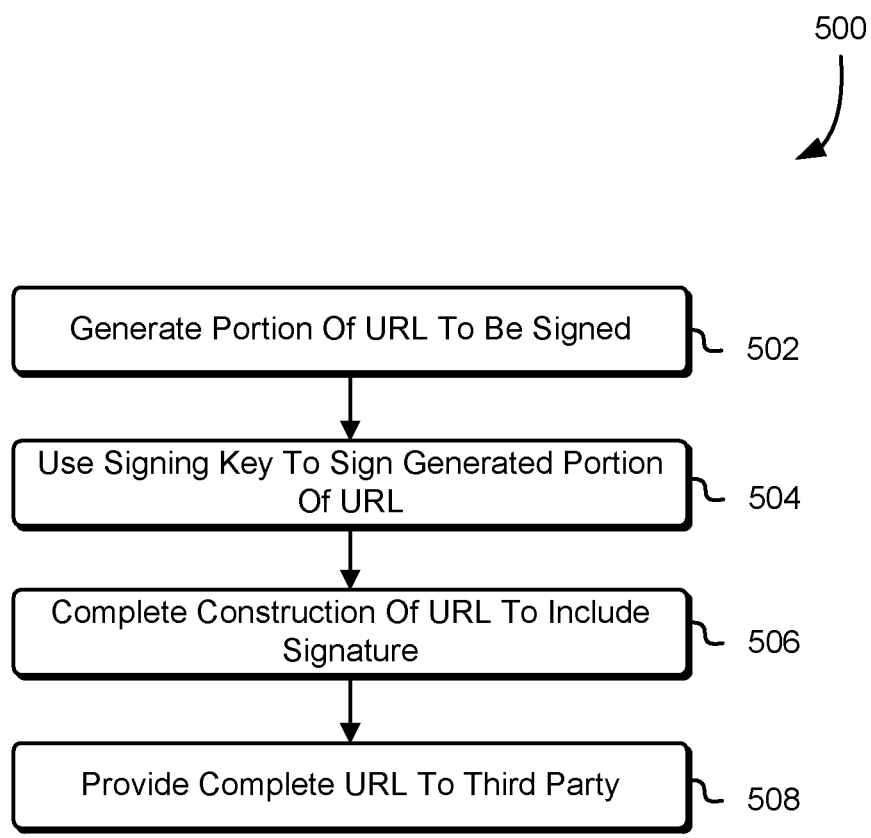
FIG. 5 shows an illustrative example of a process for providing access to data in accordance with at least one embodiment.

FIG. 5 shows an illustrative example of a process 500 for providing access to data in accordance with various embodiments. The process 500 may be performed by any suitable system such as a system operated by a customer such as described above in connection with FIG. 1. In an embodiment, the process 500 includes generating 502 a portion of a URL to be signed. The portion of the URL may include information for which an entity performing the process 500 desires to prevent forgery. In various embodiments, the amount of information included in the portion of the URL to be signed may vary. For example, the portion of the URL to be signed may include a path to a resource of a customer, a cryptographic key, one or more contextual parameters defining when and/or how the URL is usable to make a request fulfillable by a service provider and/or other information.

Once the portion of the URL to be signed has been generated 502, the process 500 may include using 504 a signing key to sign the generated portion of the URL. The signing key may be any cryptographic key that, when used to generate an electronic signature renders the electronic signature verifiable by a service provider to which the URL is submittable. For example, in some embodiments, the signing key may be secret information shared between an entity performing the process 500 and the service provider. In other embodiments, the signing key may be a private key of a public-private key pair where the service provider can utilize a public key of the public-private key pair (and possibly a certificate authority) to verify the electronic signature. It should be noted that while FIG. 5 shows the portion of the URL that is signed containing the cryptographic key, some embodiments may have the signing key included outside of the portion of the URL that is signed. Such inclusion of the cryptographic key may be used, for example, where forgery of the key is not an issue. For instance, if the URL is usable to access data from data storage, a modified cryptographic key would generally be unusable to decrypt data and, as a result, there may not be a need to protect against modification of the key.

Once the signing key has been used to generate an electronic signature of the generated portion of the URL, the process 500 may include completing 506 construction of the URL to include the electronic signature. As discussed, other information, such as additional parameters for the URL, may also be used to complete 506 construction of the URL. Once complete 506 the process 500 may include providing 508 the complete URL to a third party. The third party may be, for example, a customer of an entity performing the process 500 such as described above. Providing 508 the complete URL to the third party may be performed in various ways in accordance with various embodiments. For example, as discussed in more detail below, the URL may be provided in a webpage to the third party where one or more requirements for access to the webpage may be required before the webpage is provided. As an illustrative example, the third party may be required to perform a login/sign-in procedures in order to access the webpage having the complete URL. Generally, the URL may be provided in any way, such as in an electronic message or in any way by which data may be passed from one system to another. Further, it should be noted that while a third party is used for the purpose of illustration, the entity to which the URL is provided is not necessarily a third party to the provider or the customer. For example, in an embodiment where the process 500 is performed by a system of an organization, the techniques described herein may be used to provide to access to data to employees of the organization. Thus, instead of a third party, URL may be provided to a user within the organization for which the process 500 is performed. Other variations are also considered as being within the scope of the present disclosure.

Figure 6:
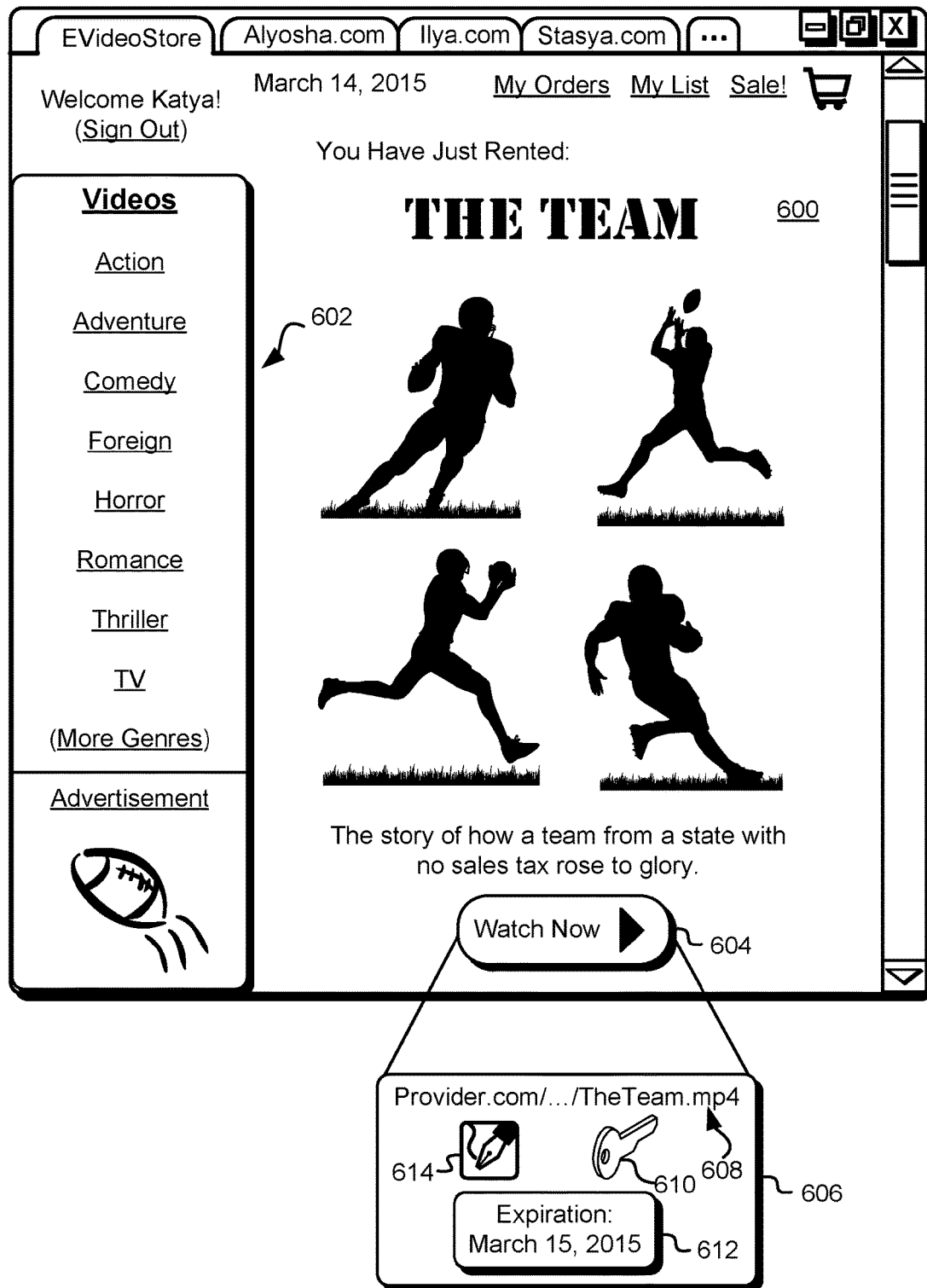
FIG. 6 shows an illustrative example of a webpage in accordance with at least one embodiment.

FIG. 6 is an illustrative example of a webpage 600 which may be used to provide URLs in accordance with various embodiments. As illustrated in FIG. 6, the webpage 600 includes various content. The content illustrated in the webpage 600 is illustrative in nature and the type and appearance and amounts of content may vary in accordance with various embodiments. The webpage 600 may be provided in various ways in accordance with various embodiments. For example, the webpage may be provided over a network to an application such as a browser application of a client such as the third party discussed above in connection with FIG. 1. The webpage 600, however, may be provided generally by any suitable device capable of receiving and processing a webpage. While a webpage 600 is used for the purpose of illustration, URLs or other resource locators configured in accordance with the various embodiments described herein may be provided in content in various ways in accordance with various embodiments. For example, content may be provided to a mobile application or other application which is not necessarily classified as a browser application. Generally, any way by which URLs or other resource locators may be provided are considered to be within the scope of the present disclosure.

As illustrated in FIG. 6, the webpage 600 includes various graphical user interface elements that enable navigation throughout a website of which the webpage 600 is a part. In this example, the webpage 600 is part of an electronic commerce website that provides access to video content, such as by providing streaming video content to one or more customers. For instance, on the left-hand side of the webpage 600 various links 602 to various video genres are provided. In this example, the links appears as textual words which enable the links to be selected using an appropriate input device such as a keyboard, mouse, touchscreen, or other input device. Selection of a link may cause an application causing the webpage 600 to be displayed to submit, pursuant to a URL associated with the link by the programming of the webpage 600, an http request to a server that provided the webpage 600 or another server. In this example, the webpage 600 also includes a graphical user element configured as a play button 604. The play button 604 may be a graphical user interface element of the webpage 600 where the underlying code of the webpage 600 is configured such that selection by an input device of the play button 604 causes a request to be submitted to an appropriate server.

In this example, the code of the webpage 600 includes a URL 606 which may be configured in accordance with the various techniques described herein. In this illustrative example the URL 606 includes a path 608 to a resource which in this instance is a video file. The URL 606 may also include a cryptographic key 610, an expiration 612, and an electronic signature 614. The electronic signature may be generated at least in part on the path 608, cryptographic key 610, and expiration 612 and/or other information. Generally, the URL 606 may include additional information that is not illustrated in the figure. Accordingly, when a user selects the play button 604 an appropriately configured request, in this example an http request, is submitted to a server using the URL 606. While not illustrated in the figures, such a request may be submitted by using the path 608 in the URL 606 to obtain an IP address of a server from a domain name service (DNS) and submitting the request with URL 606 over the internet or other network to the IP address.

A device processing the webpage 600 may receive a response which, if the URL 606 is valid at the time of submission of the request, may include the resource to which the path 608 points. As noted elsewhere herein, if the URL 606 is invalid, for example because it was submitted past the expiration 612, or the URL 606 was modified, such a request may be denied.

Figure 7:
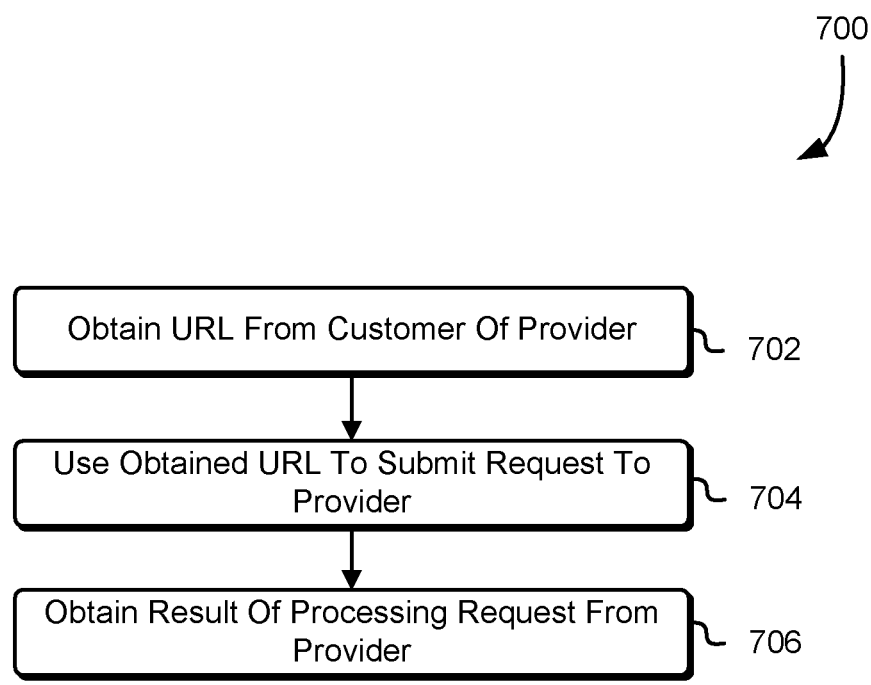
FIG. 7 shows an illustrative example of a process for obtaining access to data in accordance with at least one embodiment.

FIG. 7 shows an illustrative example of a process 700 for accessing data in accordance with various embodiments. The process 700 may be performed by any suitable system such as a system of a third party described above in connection with FIG. 1 although, as noted, a system that performs the process 700 is not necessarily a third party to other entities involved with performance with the process 700. In an embodiment, the process 700 includes obtaining 702 a URL from a customer of a provider. The URL may be obtained 702 in various ways in accordance with various embodiments such as through a webpage as described above or in another way. Once obtain 702, the obtained URL may be used 704 to submit a request to the provider. In some embodiments, the URL is provided to the provider as request formatted in a manner acceptable to the provider such as in accordance with the HTTP. In some embodiments, however, using 704 the obtained URL to submit a request to the provider may include modifying the URL prior to a submission of a request. For example, in some embodiments the URL may be used to submit a request to perform one or more operations using a cryptographic key supplied by the URL on data added to the URL by the system performing the process 700. As another example, a system performing the process 700 may add one or more parameters to the URL for various purposes such as for instructing the provider how to process the request and/or to supply information which may be required by the provider in addition to a valid signature in the obtained URL to fulfill the request. Other information useful to the system performing the process 700 and/or the provider may also be included.

Adding to the obtained URL may include adding information to a portion of the URL outside of a portion used to generate an electronic signature that was included with the obtain URL. In this manner, information can be added to the URL without invalidating the electronic signature. Once the obtained URL has been used 704 to submit a request to the provider, the process 700 may, assuming the request was properly submitted and otherwise fulfillable, obtain 706 a result of processing the request from the provider. For example, depending on one or more operations specified by the request the result may be included in a response from the provider. As an example, if the request was to encrypt or decrypt data provided with or otherwise specified by the request, the result obtained 706 may include encrypted or decrypted data, as appropriate. Generally, depending on the cryptographic operations performed using the cryptographic key provided in the request, the result obtained 706 may vary.

Figure 8:
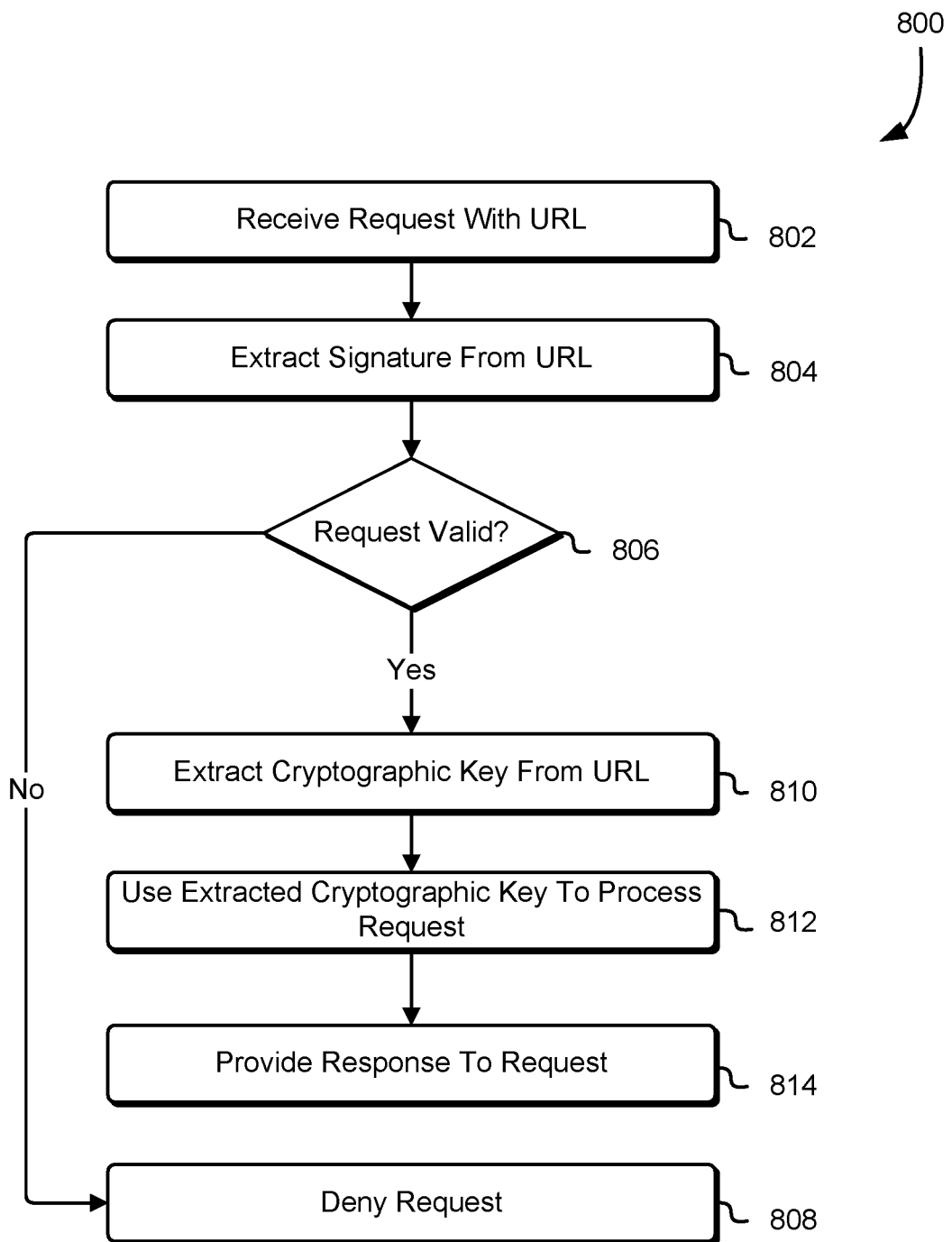
FIG. 8 shows an illustrative example of a process for processing a request in accordance with at least one embodiment.

FIG. 8 shows an illustrative example of a process 800 for providing access to data. The process 800 may be performed by a suitable system such as a web server of a service provider such as described above. In an embodiment, the process 800 includes receiving 802 a request with a URL. The URL may include a cryptographic key and an electronic signature and/or other information such as described above. An electronic signature may be extracted 804 from the URL and used to determine 806 whether the request is valid. Determining 806 whether the request is valid may be performed in various ways in accordance with various embodiments such as by using a symmetric signature verification algorithm or an asymmetric signature verification algorithm to verify the electronic signature, which may include communication with a certificate authority to use a public key of a public-private key pair to determine validity of the electronic signature.

If determined 806 that the signature is invalid, the process 800 may include denying 808 the request. The request may be denied 808 in various ways in accordance with various embodiments, such as by transmitting a communication indicated that the request was denied and/or one or more reasons for its denial. Other ways by which a request may be denied may also be used such as by simply not fulfilling the request, without necessarily transmitting a communication in response to the request. Generally, any way by which a request may be denied may be used. If, however, it is determined 806 that the signature is valid, the process 800 may include extracting 810 a cryptographic key from the URL that was received 802. The extracted cryptographic key may be used 812 to process (i.e., fulfill) the request. Processing the request may include using the cryptographic key to perform one or more cryptographic operations on data included with or otherwise specified by the request. A response to the request may be provided 814. Providing 814 the response may include providing a result of performance of one or more cryptographic operations using the cryptographic key (e.g., encrypted data, decrypted data, and/or an electronic signature) and/or an acknowledgment that such operations were performed.

While the process 800 is described in a particular way for the purpose of illustration, variations are considered as being within the scope of the present disclosure. For example, FIG. 8 shows the request being processed on the condition that the signature is valid. However, one or more other operations may be performed to determine whether to process the request. As one example, determining whether the request is valid may include checking whether the request complies with policy. Accordingly, policy configured by a customer of the service provider may be checked in order to determine whether fulfillment of the request is in compliance with the policy. Further, as noted above, URLs may contain various contextual conditions about if and/or how the request should be performed. Accordingly, determining 806 whether the request is valid during performance of the process 800 may include checking whether such conditions are fulfilled and/or processing the request in accordance with such information included in the URL. Generally, fulfillment of the request may require one or more conditions to be satisfied and the manner in which a request is fulfilled may be at least partially dependent on parameters specified in the request.

Further, in some embodiments, upon use of the cryptographic key the process may include performing one or more operations that cause access to the cryptographic key by a system and generally by entity for which the process 800 is performed to be lost. The operations that cause a loss of access to the cryptographic key may include, for example, overwriting one or more memory locations in which the cryptographic key is stored and/or taking one or more actions that allow such memory locations to be overwritten such as in order to process subsequent requests. Generally, any operations which cause access to the cryptographic key to be lost immediately or eventually may be performed. In this manner, the customer that supplied the key in the URL can be ensured that the service provider has access to the cryptographic key for a limited duration corresponding to when the cryptographic key is needed to fulfill a request. Other variations are also considered as being within the scope of the present disclosure.

Figure 9:
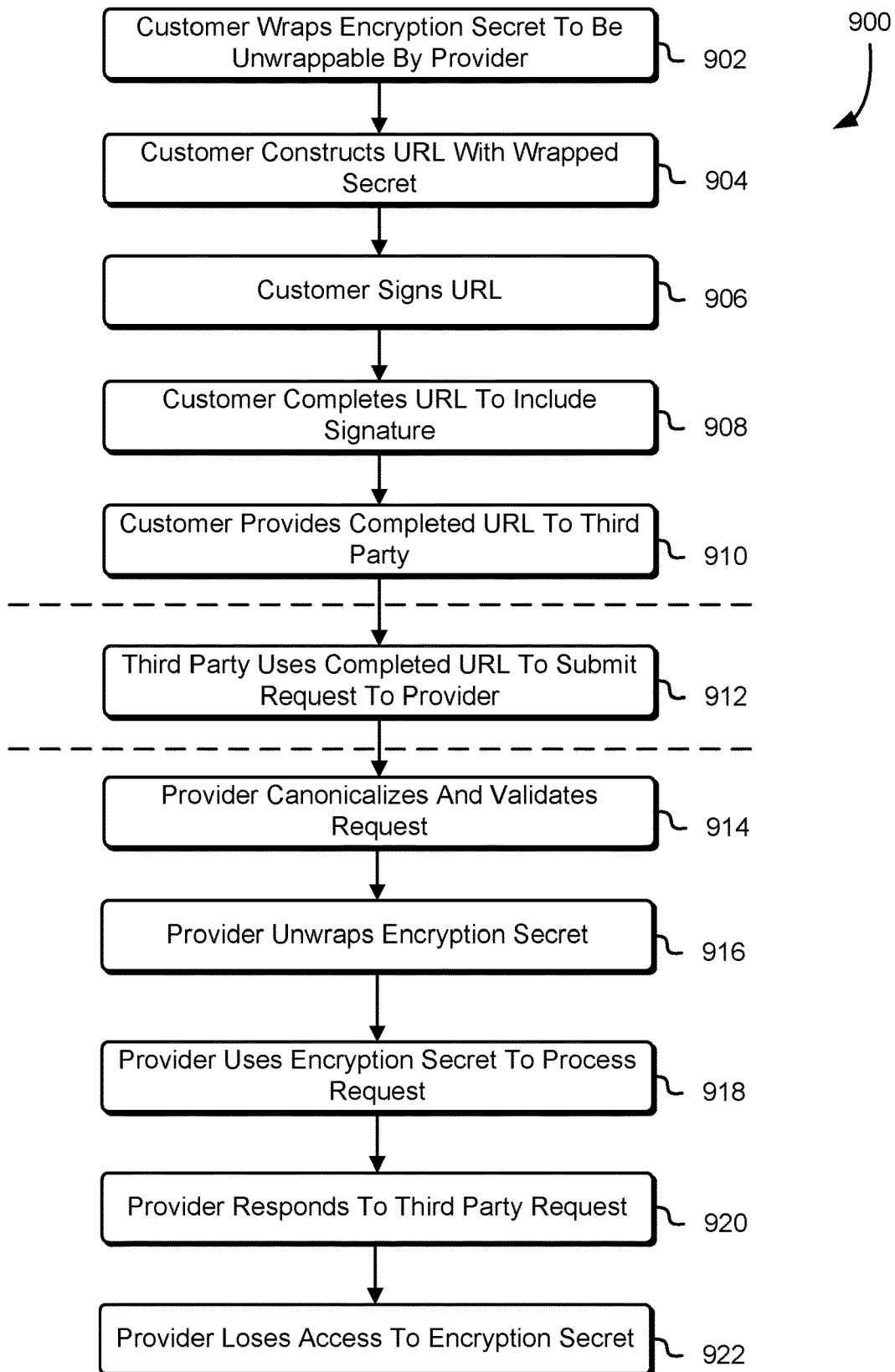
FIG. 9 shows an illustrative example of a process for requesting and providing access to data in accordance with at least one embodiment.

FIG. 9 shows an illustrative example of a process for providing access to data in accordance with an embodiment. As illustrated in FIG. 9 the process may be performed by suitable system and, in this particular example, possibly by multiple systems as indicated by the dashed lines separating operations of the process 900 from each other. In an embodiment, the process 900 includes a customer wrapping 902 an encryption secret to be unwrappable (obtainable) by a provider. Wrapping the encryption secret may be performed, for example, by encrypting the encryption secret using a suitable cryptographic key such that the key is unwrappable (decryptable) by the provider. For example, the encryption secret may be wrapped using secret information shared between a customer of the provider and the provider. As another example, the encryption secret may be wrapped using a public key of a public-private key pair where the provider is able to unwrap the encryption secret using a private key from the public-private key pair. It should be noted that while FIG. 9 is illustrated as the wrapped encryption secret being unwrappable by the provider, generally variations of the present disclosure include those where the provider does not unwrap the encryption itself, but is able to have another system (e.g., a third party system) unwrap the encryption secret on its behalf.

Returning to the illustrative example of FIG. 9, the customer may construct 904 a URL with the wrapped secret. The URL may be constructed 904 such as described above. A customer then may sign 906 the URL by generating an electronic signature of the constructed URL using an appropriate signing key. The URL may then be completed 908 to include the electronic signature. The completed URL may then be provided 910 to a third party such as described above. Upon having been provided 910 the completed URL, a third party may use 912 the completed URL to submit a request to the provider. As one example, the URL may be coded in a webpage or other content to be selectable by a user of the third party to cause an application of the third party to submit a request to the provider using the completed URL.

Once the request has been submitted to the provider, the provider may canonicalize and validate 914 the request. It should be noted that canonicalization may be performed to reverse the various ways by which requests may be mutated during their transmission from one entity to another. Canonicalization may be performed, for instance, in order to ensure that validation of the electronic signature is performed correctly. For example, additional characters inserted into the request or removed from the request may be removed and/or added as appropriate in order to ensure that if the request is valid the electronic signature will be valid as well. A provider, upon validation of the request, may unwrap 916 the encryption secret by performing (or otherwise causing to have performed) an appropriate cryptographic algorithm to decrypt the encryption secret. The encryption secret may then be used 918 to process the request and the provider may respond 920 to the third party request, such as providing a result of performance of the one or more cryptographic operations that the provider performed and/or an acknowledgement of their performance. As noted above, the provider may then lose 922 access to the encryption secret such as described above.

Other variations are considered as being within the scope of the present disclosure. For example, the types and ways in which keys are provided in URLs or generally requests to providers may vary in accordance with various embodiments. Some techniques which may be combined with the techniques of the present disclosure are described in U.S. patent application Ser. No. 14/037,292, filed Sep. 25, 2013, now U.S. Pat. No. 9,311,500, entitled "DATA SECURITY USING REQUEST-SUPPLIED KEYS," which is incorporated in here by reference for all purposes.

Figure 10:
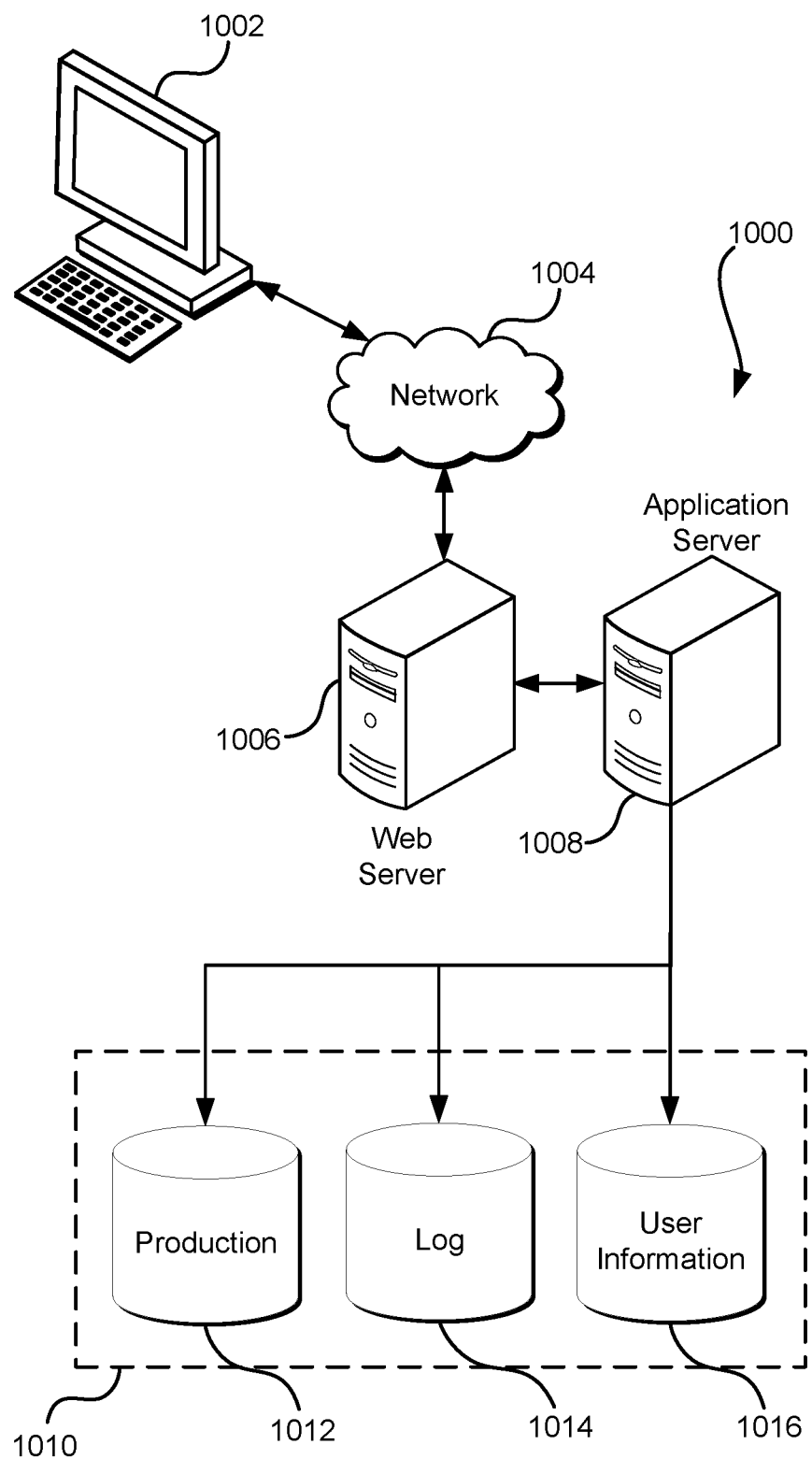
FIG. 10 illustrates an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling some (even a majority) of the data access and business logic for an application. The application server may provide access control services in cooperation with the data store and is able to generate content such as text, graphics, audio and/or video to be transferred to the user, which may be served to the user by the web server in the form of HyperText Markup Language ("HTML"), Extensible Markup Language ("XML") or another appropriate structured language in this example. The handling of all requests and responses, as well as the delivery of content between the client device 1002 and the application server 1008, can be handled by the web server. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed system.

The data store 1010 can include several separate data tables, databases or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members used in the above conjunctive phrase, "at least one of A, B, and C" and "at least one of A, B and C" refers to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C to each be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A method, comprising:
   receiving a request for information from a user, the request including a uniform resource locator comprising a first cryptographic key, a portion signed with the first cryptographic key, and an unsigned portion; and
   providing access to the information to the user based, at least in part, on the first cryptographic key and on information in the unsigned portion modified by a third party without affecting validity of the signed portion.

2. The method of claim 1, wherein the method further comprises determining that the signed portion is valid using a second cryptographic key.

3. The method of claim 2, further comprising providing access to the information as a result of determining that the cryptographic signature is valid.

4. The method of claim 2, wherein:
   the request is provided to the user by an authorizing entity; and
   the second cryptographic key is associated with the authorizing entity.

5. The method of claim 1, further comprising acquiring the information by at least performing a cryptographic operation using the first cryptographic key.

6. The method of claim 5, wherein the cryptographic operation comprises decrypting an encrypted version of the information using the first cryptographic key.

7. A system, comprising:
   one or more processors; and
   memory including instructions that, as a result of execution by the one or more processors, cause the system to:
      receive a request for information from a user, the request including a uniform resource locator that includes a first cryptographic key and an unsigned portion, the first cryptographic key associated with a signed portion of the uniform resource locator; and
      provide access to the requested information to the user based, at least in part, on the first cryptographic key and on information in the unsigned portion modified by a third party, the modification by the third party not affecting validity of the signed portion.

8. The system of claim 7, wherein:
   the request includes a cryptographic signature of the uniform resource locator and the first cryptographic key; and
   the instructions further include instructions that, if executed by the one or more processors, determines that the cryptographic signature is valid using a second cryptographic key.

9. The system of claim 8, wherein the instructions further include instructions that, if executed by the one or more processors, causes the system to:
   provide access to the information as a result of determining that the cryptographic signature is valid.

10. The system of claim 8, wherein:
    the request is provided to the user by an authorizing entity; and
    the second cryptographic key is associated with the authorizing entity.

11. The system of claim 7, wherein the instructions further include instructions that, if executed by the one or more processors, causes the system to:
    acquire the information by at least performing a cryptographic operation using the first cryptographic key.

12. The system of claim 11, wherein the cryptographic operation comprises decrypting an encrypted version of the information using the first cryptographic key.

13. The system of claim 10, wherein:
    the second cryptographic key is a public key of a public-private key pair associated with the authorizing entity; and
    a private key of the public-private key pair is not accessible to the system.

14. A non-transitory computer-readable storage medium having stored thereon instructions that, as a result of execution by one or more processors of a computer system, cause the computer system to:
    acquire a request, the request including a first cryptographic key, a signed portion, and an unsigned portion of a uniform resource locator, the signed portion associated with the first cryptographic key;
    transmit the request; and receive a response to the request generated based at least in part on the first cryptographic key and information in the unsigned portion, the information in the unsigned portion modified without affecting validity of the signed portion.

15. The non-transitory computer-readable storage medium of claim 14, wherein the instructions further include instructions that, as a result of execution by one or more processors of a computer system, causes the computer system to:

receive a cryptographic signature with the request, the cryptographic signature generated with a second cryptographic key; and transmit the cryptographic signature with the request.

16. The non-transitory computer-readable storage medium of claim 15, wherein the second cryptographic key is not available to the computer system.

17. The non-transitory computer-readable storage medium of claim 15, wherein:

the second cryptographic key is a private key of a public-private key pair; and the cryptographic signature is cryptographically verifiable using a public key of the public-private key pair.

18. The non-transitory computer-readable storage medium of claim 14, wherein:

the request is in a form of a uniform resource locator for a Web service; and the request is transmitted to a Web service.

19. The non-transitory computer-readable storage medium of claim 14, wherein the instructions further include instructions that, as a result of being executed by the one or more processors, causes the computer system to:

transmit encrypted data with the request, the encrypted data encrypted with the first cryptographic key; and receive a plaintext version of the encrypted data.

20. The non-transitory computer-readable storage medium of claim 14, wherein the instructions further include instructions that, as a result of being executed by the one or more processors, causes the computer system to:

transmit data with the request; and receive an encrypted version of the data, the encrypted version of the data encrypted with the first cryptographic key.

\* \* \* \* \*

UNITED STATES PATENT AND TRADEMARK OFFICE
CERTIFICATE OF CORRECTION

| | | |
|---|---|---|
| PATENT NO. | : 10,412,059 B2 | Page 1 of 1 |
| APPLICATION NO. | : 15/786322 | |
| DATED | : September 10, 2019 | |
| INVENTOR(S) | : Gregory Branchek Roth | |

It is certified that error appears in the above-identified patent and that said Letters Patent is hereby corrected as shown below:

In the Specification

Column 3, Line 27: "102 and is service provider 104. The customer 102 is"
Should read as: -- 102 and service provider 104. The customer 102 is --

Column 3, Line 38: "maintaining a sufficiently robust data storage system the"
Should read as: -- maintaining a sufficiently robust data storage system, the --

Column 7, Line 19: "the request processing infrastructure may comprise a"
Should read as: -- the request processing infrastructure 212 may comprise a --

Column 7, Line 21: "behalf of customer of the service provider 200. Other"
Should read as: -- behalf of a customer of the service provider 200. Other --

Column 8, Line 67: "portion may include information that modification of which"
Should read as: -- portion may include information the modification of which --

Column 9, Lines 31-32: "cryptographic key to the URL and use the URL with additional cryptographic key to submit a request to the"
Should read as: -- cryptographic key to the URL and use the URL with an additional cryptographic key to submit a request to the --

Column 11, Line 20: "provided. In this example, the links appears as textual words"
Should read as: -- provided. In this example, the links appear as textual words --

Signed and Sealed this
Tenth Day of May, 2022

Katherine Kelly Vidal
*Director of the United States Patent and Trademark Office*